United States Patent Office 3,102,124
Patented Aug. 27, 1963

3,102,124
PREPARATION OF 2,3-DICYANO-5,6-DICHLORO-BENZOQUINONE
Peter W. D. Mitchell, Mount Royal, Quebec, Canada, assignor to American Home Products Corporation, New York, N.Y., a corporation of Delaware
No Drawing. Filed Apr. 27, 1961, Ser. No. 105,864
1 Claim. (Cl. 260—396)

The invention relates to new and improved methods for preparing 2,3-dicyano-5,6-dichlorobenzoquinone, a compound which has recently been found to be of considerable value as an oxidation and dehydrogenation reagent. For example, it has been used to oxidize allylic alcohols to α,β-unsaturated ketones and to dehydrogenate partially aromatic ring systems. By the processes of my invention I am able to prepare this compound in fewer steps and with considerably less manipulation than the prior art processes called for. A further advantage of my new new processes is that they require considerably less time than was formerly necessary.

The new process may be outlined schematically as follows:

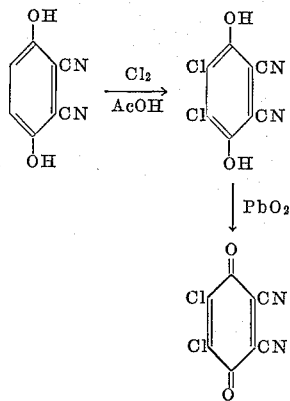

As will be seen from the foregoing, the starting material in the preparation of 2,3-dicyano-5,6-dichlorobenzoquinone by the processes of this invention is 2,3-dicyanohydroquinone, which may be made from benzoquinone as taught by Helferich and Bodenbender, Ber., 1923, 56B, 1112; Chem. Abs., 1923, 17, 3175.

In the first step of my new process, 2,3-dicyanohydroquinone is chlorinated in boiling acetic acid to convert it to 2,3-dicyano-5,6-dichlorohydroquinone, which separates as a nearly insoluble precipitate. Although the theoretical chlorine requirement for this chlorination step is 2 mols, I have found that I obtain the maximum yield of 2,3-dicyano-5,6-dichlorohydroquinone when I employ from three to four mols of chlorine.

The crude chlorination product may be filtered off and dehydrogenated by shaking with a suspension of lead dioxide in a two-phase mixture of an aromatic hydrocarbon solvent and an aqueous lower alkanol acidified with hydrochloric acid. The 2,3-dicyano-5,6-dichlorobenzoquinone may be recovered by filtering the resulting emulsion, discarding the aqueous phase, washing the hydrocarbon phase, drying it, and concentrating it until the quinone crystallizes.

Among aromatic hydrocarbon solvents which may be used in the above dehydrogenation step may be mentioned benzene, toluene, xylene, and hydrocarbon mixtures consisting mainly of one or more of these. The aromatic hydrocarbon solvent preferentially dissolves the quinone as formed, removing it from aqueous layer, in which it is rather unstable.

The concentration of hydrochloric acid used is not extremely critical, it having been found that concentrations of from about 2% to 38% may be used; best results, however, are obtained when acid of from about 3 to 10% concentration is employed.

The lower alkanol is employed to serve as a partial solvent for the dicyanodichlorohydroquinone. Methanol, ethanol, and propanol are suitable, though I prefer ethanol for this purpose.

Example 1

Ten grams of 2,3-dicyanohydroquinone are added to 100 ml. of glacial acetic acid contained in a three-neck flask fitted with a stirrer, condenser, and gas inlet tube, and the mixture is heated to gentle refluxing. Chlorine gas (about 15 g.) is passed into the solution at a rate sufficient to maintain saturation of the solution. A crystalline solid separates, and after one and a half hours the contents of the flask are cooled to room temperature and the 2,3-dicyano-5,6-dichlorohydroquinone separated by filtration. The product is washed with chloroform and dried. 6.4 g. of colorless crystals are obtained, indicating a 44% yield. The product is practically insoluble in hot water, and may be recrystallized from aqueous ethanol to yield needles which are unchanged on heating to 300° C.

Example 2

Ten grams of 2,3-dicyano-5,6-dichlorohydroquinone are suspended in a mixture of 40 ml. of ethanol and 110 ml. of 5% hydrochloric acid contained in a stoppered flask. 220 ml. of benzene and 44 g. of lead dioxide are added, and the contents of the flask are shaken vigorously for ten minutes. The emulsion is filtered through celite, the residue washed with benzene, and the combined filtrates transferred to a separatory funnel. The aqueous phase is removed and discarded; the benzene layer is washed twice with small amounts of water, dried over magnesium sulfate, concentrated to a volume of about 10 ml., and allowed to crystallize. In contact with the solution the crystals so obtained of 2,3-dicyano-5,6-dichlorobenzoquinone are deep red in color, but when separated and dried are yellow. The yield is 8.3 g. or about 84% of a product melting from 206 to 209° C.

I claim:

A method of preparing 2,3-dicyano-5,6-dichlorobenzoquinone which comprises the steps of dispersing 2,3-dicyano-5,6-dichlorohydroquinone in a two phase mixture comprising a lower alkanol, aqueous hydrochloric acid, and an aromatic hydrocarbon solvent, agitating the resulting mixture with an excess of lead dioxide, separating the liquid phases from the solids, and recovering 2,3-dicyano-5,6-dichlorobenzoquinone from the non-aqueous phase.

References Cited in the file of this patent

Whitmore: "Organic Chemistry," 2nd ed., pp. 666, 685–7, Prentice Hall (1951).
Fieser et al.: "Organic Chemistry," 3rd ed., p. 719, Reinhold (1956).
Bernthsen and Sudborough: "Organic Chemistry," 4th ed., page 499 (1941) (Blackie).
Helferich and Bodenbender: Berichte, vol. 56B, p. 1112 (1923).